United States Patent [19]

Yamamura

[11] Patent Number: 4,961,696
[45] Date of Patent: Oct. 9, 1990

[54] INJECTION MOLDING MACHINE WITH A RESIN PRESSURE DETECTING FUNCTION

[75] Inventor: Masato Yamamura, Oshino, Japan

[73] Assignee: Fanuc Ltd., Minamitsuru, Japan

[21] Appl. No.: 329,787

[22] PCT Filed: Jul. 22, 1988

[86] PCT No.: PCT/JP88/00741
§ 371 Date: Mar. 15, 1989
§ 102(e) Date: Mar. 15, 1989

[87] PCT Pub. No.: WO89/00915
PCT Pub. Date: Feb. 9, 1989

[30] Foreign Application Priority Data

Jul. 24, 1987 [JP] Japan ................... 62-183449

[51] Int. Cl.⁵ ............................................ B29C 45/77
[52] U.S. Cl. .................... 425/149; 264/40.1; 425/170
[58] Field of Search ............ 425/145, 149, 169, 170, 425/192 R, 542; 264/40.3, 40.1, 40.5

[56] References Cited

U.S. PATENT DOCUMENTS 4,758,391 7/1988 Shimizu et al. .................. 425/149

FOREIGN PATENT DOCUMENTS

| 2454193 | 5/1976 | Fed. Rep. of Germany ...... 425/145 |
| 61-195819 | 8/1986 | Japan ................... 425/149 |
| 62-44417 | 2/1987 | Japan ................... 425/145 |
| 62-218118 | 9/1987 | Japan . |
| 2175713A | 12/1986 | United Kingdom ............ 425/149 |

Primary Examiner—Jay H. Woo
Assistant Examiner—James P. Mackey
Attorney, Agent, or Firm—Staas & Halsey

[57] ABSTRACT

An injection molding machine having a resin pressure detector in the form of a strain gauge bonded on an annular member (55) which is fixed to a rear end face of a metering bearing housing (41) by bolts (57), and which has a rear end face to which a ball nut (56) is fixed by bolts (59). Upon assemblage, no substantial deformation of the annular member occurs, and hence no zero point shift in the strain gauge is found, so that an accurate detection is achieved by the strain gauge. The maintenance and replacement of the annular member, disposed outside the housing, can be easily performed.

5 Claims, 4 Drawing Sheets

INJECTION MOLDING MACHINE WITH A RESIN PRESSURE DETECTING FUNCTION

TECHNICAL FIELD

The present invention relates to an injection molding machine of a type having a detector which is capable of simply and accurately detecting resin pressure, and is arranged to facilitate assemblage, maintenance and replacement of the detector.

BACKGROUND ART

Conventionally, an injection molding machine has been known, which has a detector for detecting resin pressure, i.e., injection pressure, hold pressure and back pressure, and performs pressure control in accordance with the detected resin pressure so as to produce good molding products. In general, a pressure sensor disposed within a mold cavity has been employed for detection of the resin pressure. However, this type of sensor is high-priced. In this respect, a strain detector, disposed on a housing which axially supports a screw shaft, for receiving the reaction force from the resin material to detect the resin pressure, has been proposed.

As shown in FIG. 5, this type of detector comprises an annular member 1 and a detecting element such as a strain gauge (not shown) affixed thereon. The annular member 1 is disposed between a thrust ball bearing 3 and a stepped portion 5 formed in a metering bearing housing 2 which is axially and radially supported by the bearing 3 and an angular ball bearing 4, respectively. In assembling the above-mentioned arrangement in which the annular member 1 is interposed between the bearing 3 and the stepped portion 5 within the housing 2, lead wires of the strain gauge must be passed through the housing 2, and an axial clamping force is inevitably applied to the annular member 1 upon assemblage thereof and even thereafter. As a consequence, the annular member 1 is deformed at a portion on which the strain gauge is affixed. Thus, an output from the strain gauge is produced even before the resin pressure is actually generated, that is, a shift of zero point in resin pressure detection takes place. In this connection, a required zero adjustment is made by means of an appropriate circuit in the resin pressure control system upon detection of the resin pressure. Moreover, since the annular member 1 is disposed within a hollowed interior of the metering bearing housing 2, it is troublesome or difficult to effect replacement and maintenance of the annular member 1 and wiring of the lead wires of the strain gauge.

DISCLOSURE OF THE INVENTION

The object of the present invention is to provide an injection molding machine equipped with a resin pressure detector which is capable of accurately detecting the resin pressure, without the need of correcting the detected resin pressure, and has a construction which facilitates maintenance, replacement, and assemblage, including wiring.

To achieve the above-mentioned object, according to the present invention, there is provided an injection molding machine of a type having an injection unit which includes a metering bearing housing disposed for movement in unison with a metering screw, and a ball screw/nut mechanism for reciprocal movement of the screw through the housing. The injection molding machine comprises an annular member on which a resin pressure detecting element is mounted, a first fixture means for fixing said annular member on an outer face of the metering bearing housing at a side remote from the screw, and a second fixture means for fixing a ball nut of the ball screw/nut mechanism on an outer face of said annular member at a side remote from the metering bearing housing.

As mentioned above, according to the present invention, since the annular member for resin pressure detection is fixed to the outer face of the metering bearing housing, the resin pressure detecting element can be mounted on the annular member after completion of assemblage of the annular member and its peripheral components, to thereby eliminate a detection error resulting from a deformation of the annular member which occurs at the time of assembling. Moreover, since the connection between the annular member and the housing and the connection between the annular member and the ball nut are independent and separate from each other, a deformation over the axial entire region of the annular member is prevented from occurring. This makes it possible to mount the detecting element on the annular member at a location free from any deformation associated with assembling, to thereby eliminate an occurrence of a detection error, even when the detecting element is mounted beforehand prior to assemblage of the arrangement. As a result, the resin pressure can be accurately detected, without the need of correcting the output from the resin pressure detecting section. Moreover, since the annular member is disposed outside the housing, the assembling, maintenance and replacement operations of the annular member and its peripheral components can be carried out with ease, and the wiring operation between the resin pressure detecting element and components of the resin pressure detecting system disposed outside the injection unit can be easily carried out.

BEST MODE OF CARRYING OUT THE INVENTION

Figure 1:
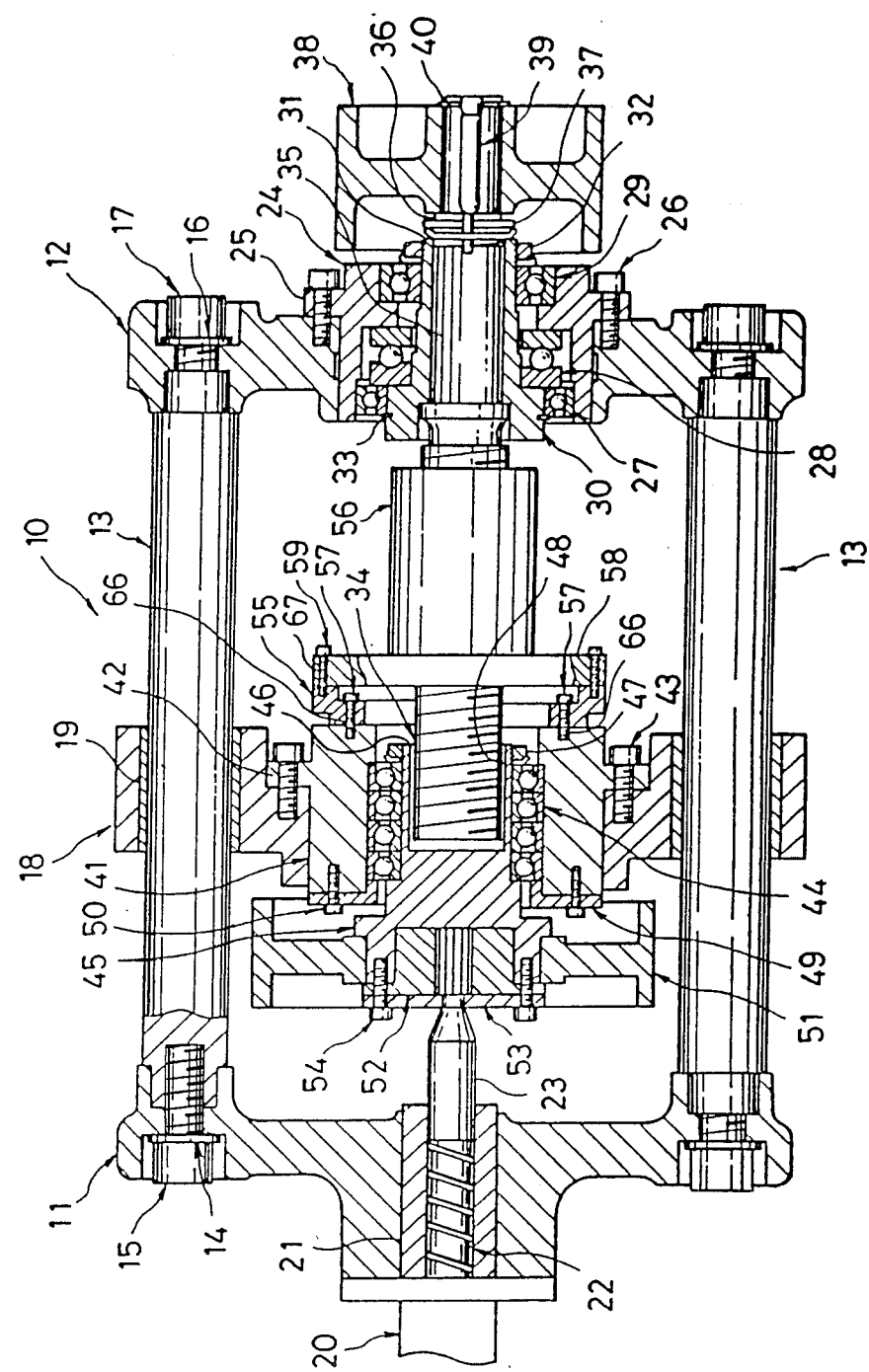
FIG. 1 is a fragmentary plan view, partly shown in cross section, of an injection unit of an injection molding machine according to a first embodiment of the present invention.

In FIG. 1, reference numeral 10 denotes an injection unit of an injection molding machine according to a first embodiment of the present invention, which is of a type where a ball screw for injection is driven by a motor to move a pusher plate. In this unit 10, each of tie rods 13 has a front end connected through a washer 14 to a front plate 11 by means of a socket screw 15, and a rear end connected through a washer 16 to a rear plate 12 by a similar bolt 17, respectively, and a pusher plate 18 is slidably mounted on the tie rods 13 through oilless bushings 19.

Connected to a central part of the front plate 11 is a proximal portion 21 of an injection cylinder 20 from which a proximal portion 23 of a metering screw 22, disposed for movement within the cylinder 20, projects rearwardly, i.e., towards the rear plate 12.

A ball screw bearing housing 24, which has a flange 25 connected to the rear plate 12 by bolts 26, rotatably supports a bearing sleeve 30 through a radial ball bearing 27, a thrust ball bearing 28, and an angular ball bearing 29. This sleeve 30 is mounted in the housing 24 in a manner axially immovable relative thereto by a nut 32 threadedly engaged with a male screw portion 31 which is formed on an outer peripheral face of the sleeve 30 at a location close to a rear end of the same sleeve, with a fixture ring 33 abutting against an outer end face of the bearing 27. The bearing sleeve 30 receives a proximal portion 35 of a ball screw 34 inserted therethrough, and the sleeve 30 and the above-mentioned proximal portion 35 are fixed to each other for integral rotation by means of a nut 37 which is threadedly engaged with a male screw portion 36 formed at an outer end portion of the proximal portion 35.

The ball screw 34 has a rear end portion, projecting outwardly of the bearing sleeve 30, on which a pulley 38 for injection is affixed by means of a key 39 and a fixture ring 40. Further, a servomotor (not shown) for injection is coupled to the pulley 38 through a timing belt (not shown).

The metering bearing housing 41 has a flange 42 connected to the pusher plate 18 by bolts 43, and rotatably receives therein a screw sleeve 45 through angular ball bearings 44. The sleeve 45 is mounted in the housing 41 in a manner axially immovable relative thereto by a nut 47, which is threadedly engaged with a male screw portion 46 formed at a rear end of the sleeve 45, with the angular ball bearings 44 held between a stepped portion of the sleeve 45 and the nut 47. The screw sleeve 45 has a rear side half portion formed with a hole 48 which receives therein a front end portion of the ball screw 34.

A fixture plate 49, which is fixed to a front end of the metering bearing housing 41 by bolts 50, fixedly holds the angular ball bearings 44 within the metering bearing housing 41. Projecting from the housing 41 towards the front plate 11 is a front end portion of the screw sleeve 45 on which a pulley 51 for metering is affixed. A servomotor (not shown) for metering is coupled to the pulley 51 through a timing belt (not shown).

A spline bushing 52 is fixed at a front end face of the screw sleeve 45 by bolts 54 through a screw retainer 53, and a proximal portion 23 of the metering screw 22 is fixed to the bushing 52, so that the screw is rotatable in unison with the bushing but axially immovable relative thereto.

Fixed to a rear end face of the metering bearing housing 41 by bolts 57 is an annular member 55 on which a resin pressure detecting element, comprised of a strain gauge 100 (FIG. 2), for instance, is mounted. The annular member 55 has a rear end face on which a ball nut 56, threadedly engaged with the injection ball screw 34, is fixed at its flange 58 by bolts 59. That is, the connection at one side of the annular member 55 facing the metering bearing housing 41 is independently and separately achieved from that at the other side of the same member facing the ball nut 56.

Figure 2:
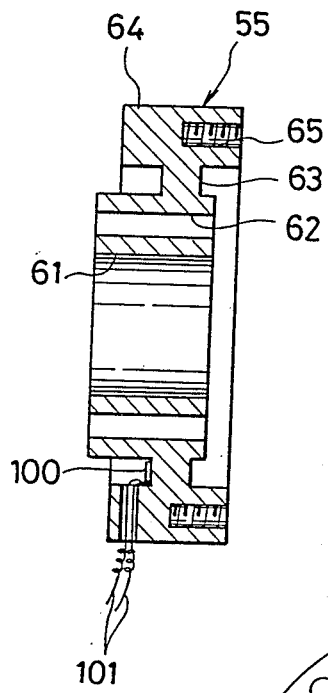
FIG. 2 is an enlarged sectional view showing an annular member of the embodiment of FIG. 1.
Figure 3:
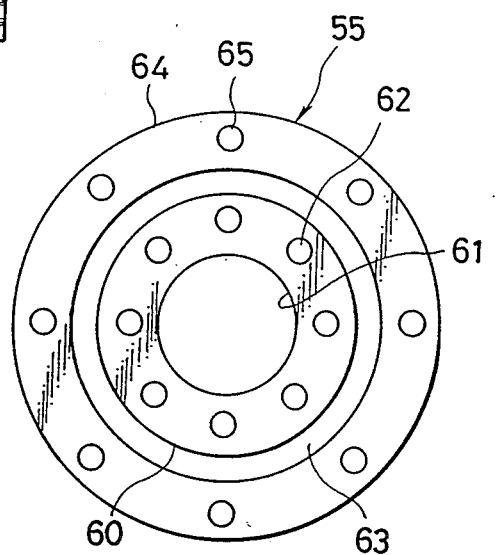
FIG. 3 is a front view of the annular member of FIG. 2.

More specifically, as shown in FIGS. 2 and 3, the annular member 55 consists of an inner cylindrical section 60, an outer cylindrical section 64, and a coupling section 63 which connects the above-mentioned two sections 60, 64 into one piece. The inner cylindrical section 60 is formed at its central part with a through hole 61 for receiving the ball screw 34 extending therethrough, and is formed with a plurality of bolt-insertion holes 62 circumferentially of the through hole 61. The outer cylindrical section 64 is formed at its rear end face with a plurality of blind bolt-mounting holes 65. Moreover, as shown in FIG. 1, the housing 41 is formed at the rear end face with bolt-mounting holes 66 in alignment with the bolt-insertion holes 62, and the ball nut 56 is formed at its flange 58 with bolt-insertion holes 67 in alignment of the bolt-mounting holes 65, respectively.

In assembling the annular member 55 and its peripheral components, each respective bolt 57 is inserted through an associated one of the bolt-insertion holes 62 formed in the annular member 55, and is then screwed into an associated one of the bolt-mounting holes 66 of the metering bearing housing 41, to thereby fix the annular member 55 to the housing 41. Next, the ball nut 56 is brought into contact at its flange 58 with the rear end face of the outer cylindrical section 64 of the annular member 55, with the ball nut 56 engaged with the ball screw 34 which is inserted through the through hole 61 of the annular member 55. Then, each respective bolt 59 is inserted through an associated one of the bolt-insertion holes 67 of the flange 58, and is screwed into a corresponding one of the bolt-mounting holes 65 of the outer cylindrical section 64, to thereby fix the ball nut 56 to the annular member 55.

During the assembling, clamping force of the bolts 57 is applied only to the inner cylindrical section 60, and the clamping force of the bolts 59 is applied only to the outer cylindrical section 64. Hence, no substantial deformation occurs in the annular member 55 at its portion at which the strain gauge 100 is mounted.

Further, the strain gauge 100 is connected through electric wires 101 with external elements, such as a gauge amplifier and a control circuit (none of these elements illustrated), which cooperate with the gauge 100 and the annular member 55 to form a known resin pressure detecting system.

In the following, the resin pressure detecting function of the injection molding machine according to the present embodiment is explained.

When the injection pulley 38 is drivingly rotated by the injection servomotor, not shown, in a predetermined direction, i.e., in a forward direction, the ball screw 34 rotates to cause forward movement of the ball nut 56. With this forward movement, the pusher plate 18, fixed to the ball nut 56 through the annular member 55 and the metering bearing housing 41, is moved along the tie rods 13 in unison with the ball nut 56, and at the same time, the metering screw 22, fixed to the housing 41 through the screw sleeve 45, etc., to be axially immovable relative to the housing, is moved in unison with the ball nut 56, whereby the injection operation is carried out.

At this time, the annular member 55, which is integrally combined with the metering screw 22 through the above-mentioned various elements, receives the reaction force from the resin material, and is slightly deformed as a result of the resin reaction force or the injection pressure. Consequently, a signal, indicative of the amount of deformation, i.e., the injection pressure, is generated by the strain gauge 100.

As mentioned above, no substantial deformation is caused in that portion of the annular member 55 at which the strain gauge 100 is bonded, during and after the assemblage of the annular member 55 and its peripheral components. As a consequence, the output signal of the strain gauge 100 represents the accurate injection pressure, and no particular correction such as zero adjustment is required.

In the hold process following the injection process, the hold pressure is detected in a similar manner.

Thereafter, the metering pulley 51 is driven by the servomotor, not shown, to cause rotation of the metering screw 22 for execution of the metering process, wherein the back pressure is detected in a similar manner. In the above-mentioned processes, pressure control is effected in a conventional manner on the basis of the thus detected resin pressure.

Figure 4:
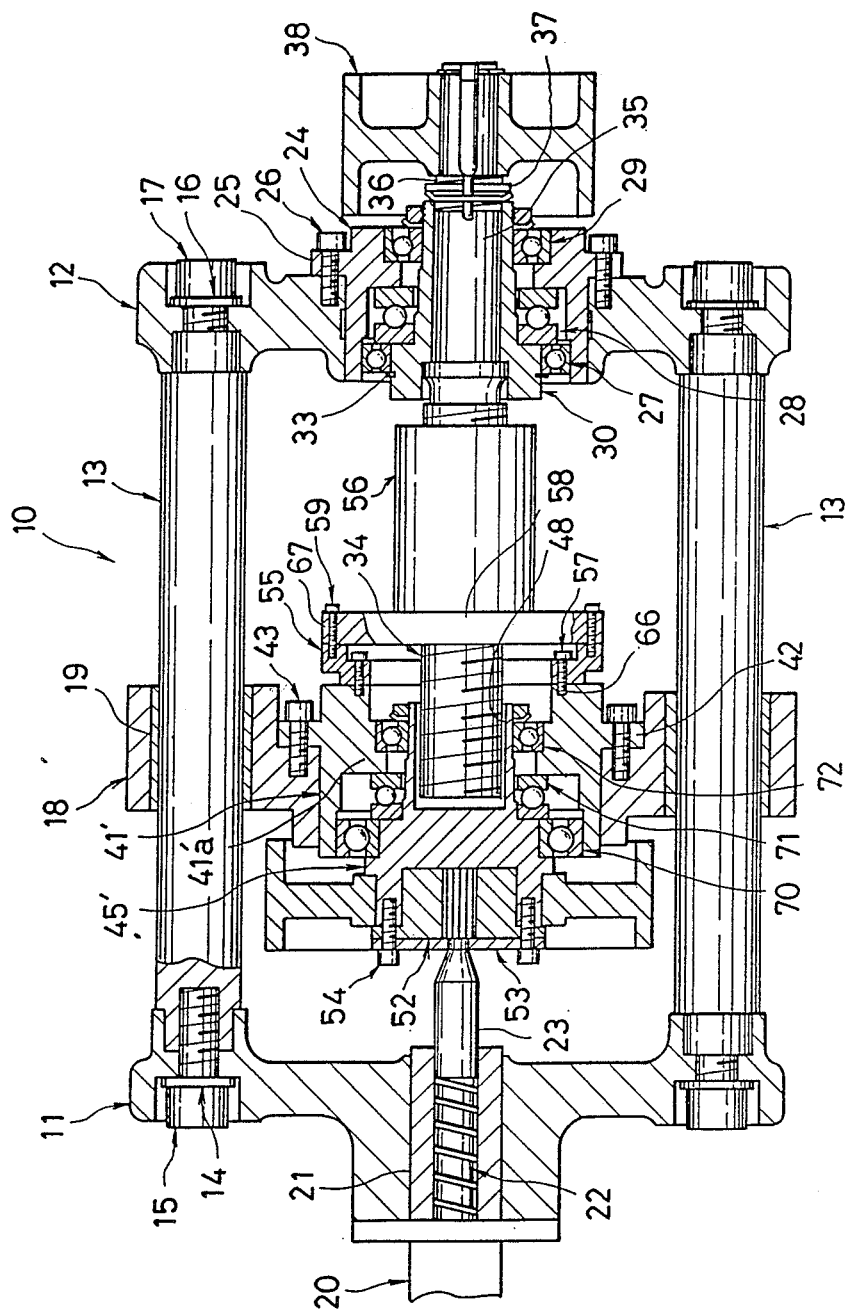
FIG. 4 is a view, similar to FIG. 1, showing an injection molding machine according to a second embodiment of the present invention.
Figure 5:
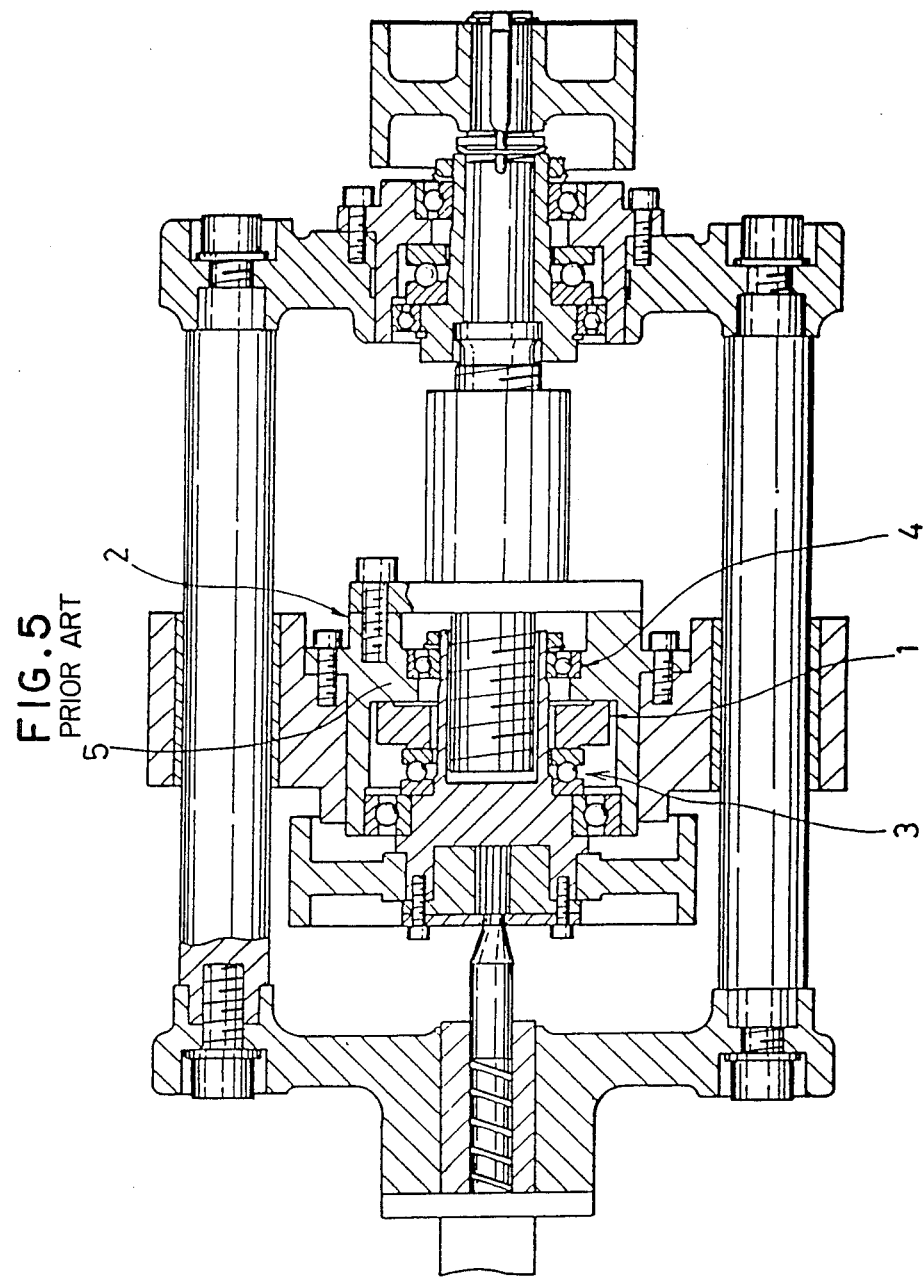
FIG. 5 is a view, similar to FIG. 1, showing a conventional injection molding machine.

FIG. 4 shows an essential part of an injection molding machine according to a second embodiment of the present invention. As compared with the arrangement of the first embodiment, this injection molding machine is slightly different therefrom in construction of a metering bearing housing and a screw sleeve, and differs in the mechanism for supporting the sleeve in the housing in a manner permitting relative rotation and preventing relative axial movement. That is, referring to FIG. 4, within a metering bearing housing 41' which has a partition wall 41'a located at a middle position in the axial direction and extending inwardly in the radial direction, a radial ball bearing 70 and a thrust ball bearing 71 are disposed at one side of the housing 41' facing the front plate 11 with respect to the partition wall 41'a, and an angular ball bearing 72 is disposed at the other side of the housing facing the rear plate 12, respectively. A screw sleeve 45' is supported by the housing 41' through the above-mentioned bearings.

The other elements of the machine are substantially the same in construction and function as those of the aforementioned embodiment of FIG. 1, and hence these common elements are shown by like numerals and explanations thereof are omitted.

I claim:

1. In an injection molding machine of a type having an injection unit which includes a metering bearing housing having a front face and a rear face and disposed for movement in unison with a metering screw, and a ball screw/nut mechanism for causing reciprocal movement of the metering screw with the housing, an injection molding machine with a resin pressure detector, comprising:

an annular member having a front face and a rear face;

a resin pressure detecting element mounted on said annular member;

a first fixture means for fixing said annular member on the rear face of the metering bearing housing; and a second fixture means for fixing a ball nut of the ball screw/nut mechanism on the rear face of said annular member;

said annular member having an undeformable portion at which no substantial deformation is found when corresponding ones of the rear face of the housing, the annular member and the ball nut are fixed by means of said first and second fixture means, respectively, the resin pressure detecting element being mounted on the undeformable portion of said annular member.

2. An injection molding machine according to claim 1, wherein said resin pressure detecting element comprises a strain gauge.

3. An injection molding machine according to claim 1, wherein said annular member includes an inner cylindrical section, an outer cylindrical section, and a coupling section connecting said inner and outer cylindrical sections into one piece, said coupling section constituting said undeformable portion and said resin pressure detecting element being mounted on said coupling section of said annular member.

4. An injection molding machine according to claim 3, wherein said inner cylindrical section is formed with a first group of circumferentially spaced bolt-insertion holes; said outer cylindrical section having a rear face formed with a first group of circumferentially spaced bolt-mounting holes; said metering bearing housing having a second group of bolt-mounting holes formed in its rear face in alignment with said first group of bolt-insertion holes; said ball nut having a second group of bolt-insertion holes on a circumferential edge portion in alignment with said first group of bolt-mounting holes; said first fixture means comprising said first group of bolt-insertion holes, said second group of bolt-mounting holes, and a first group of bolts for connecting said annular member to said metering bearing housing; and said second fixture means comprising said second group of bolt-insertion holes, said first group of bolt-mounting holes, and a second group of bolts for connecting said annular member to said ball nut.

5. An injection molding machine according to claim 4, wherein said resin pressure detecting element comprises a strain gauge.

* * * * *